(12) United States Patent
Folkmanis et al.

(10) Patent No.: US 9,136,984 B2
(45) Date of Patent: Sep. 15, 2015

(54) MULTI-LISTENER WIRELESS MEDIUM ACCESS METHOD

(71) Applicant: Google Inc., Mountain View, CA (US)

(72) Inventors: Girts Folkmanis, San Francisco, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/847,529

(22) Filed: Mar. 20, 2013

(65) Prior Publication Data

US 2014/0286229 A1  Sep. 25, 2014

(51) Int. Cl.
| H04L 1/18 | (2006.01) |
| H04W 72/12 | (2009.01) |
| H04W 84/18 | (2009.01) |
| H04W 88/04 | (2009.01) |
| H04W 40/24 | (2009.01) |

(52) U.S. Cl.
CPC ............... *H04L 1/18* (2013.01); *H04W 40/24* (2013.01); *H04W 72/1278* (2013.01); *H04W 84/18* (2013.01); *H04W 88/04* (2013.01)

(58) Field of Classification Search
None
See application file for complete search history.

(56) References Cited

U.S. PATENT DOCUMENTS

| 7,123,579 | B1 * | 10/2006 | Lyu ................................ 370/203 |
| 7,756,141 | B1 | 7/2010 | Beshai et al. |
| 8,644,209 | B2 * | 2/2014 | Seo et al. ...................... 370/315 |
| 2005/0175026 | A1 | 8/2005 | Ayyagari |
| 2007/0066314 | A1 | 3/2007 | Sherman et al. |
| 2009/0168723 | A1 * | 7/2009 | Meylan ......................... 370/331 |
| 2010/0284354 | A1 | 11/2010 | Ostergaard et al. |
| 2011/0223952 | A1 | 9/2011 | Nanda et al. |
| 2014/0036917 | A1 * | 2/2014 | Schrum et al. ................ 370/392 |

FOREIGN PATENT DOCUMENTS

EP  2091188 A1  8/2009

OTHER PUBLICATIONS

ISR and Written Opinion of PCT/US2014/023947 dated Jul. 10, 2014.
Liu, et al., "A Bluetooth Scattemet-Route Structure for Multihop Ad Hoc Networks", IEEE Journal on Selected Areas in Communications. vol. 21. No. 2, Feb. 1, 2003.
Yackovich, "Making WSN TDMA Practical: Stealing Slots Up and Down the Tree", 17th IEEE International Conference on Embedded and Real-Time Computing Systems and Applications, 2011.

* cited by examiner

*Primary Examiner* — Hong Cho
(74) *Attorney, Agent, or Firm* — Morris & Kamlay LLP

(57) ABSTRACT

Collisions in wireless networks may be avoided by limiting competing transmissions at the same time or within a temporally proximate time range. A relay schedule may be transmitted with each frame in a transmission chain, the relay schedule containing transmission time information such that each participating node in the transmission chain has designated transmission times. The transmission times may be different such that transmissions are spaced out in an effective manner. A non-participant node may receive the transmission with the relay schedule and may delay transmissions during conflicting times based on the relay schedule.

26 Claims, 4 Drawing Sheets

MULTI-LISTENER WIRELESS MEDIUM ACCESS METHOD

BACKGROUND

Conventional wireless network protocols often are based on, and share characteristics with, the architecture for physical wired networks. Some conventional wireless networks use medium access methods and frame route discovery methods that are similar to the wired networks. For example, conventional wireless networks may implement collision avoidance techniques such as listen before transmit, and their frames are routed from a source to a sink (i.e., a destination node) through a series of sequential routing devices or across a series of point-to-point links. More specifically, as an example, a conventional wireless network setup can require a transmission from, in order, a source node, a relay node R, and a destination node, such that if the transmission from the source node to relay node R fails, the entire transmission process fails.

To confirm delivery of transmission in a wireless protocol, end to end acknowledge messages may be delivered by a destination to the source ("sink-to-source"), or, intermediate acknowledge messages ("per-hop") may be delivered from each routing device in the path, or both techniques may be used (per-hop and sink-to-source). For example, a destination node may transmit a acknowledge message upon receiving a transmission message. The acknowledge message can route back to the source node via a series of sequential routing devices or across a series of point-to-point links. More specifically, as an example, a wireless network may require an acknowledge message to be sent from a destination node to a relay node R, and from the relay node R to a source node, in that order, such that if the transmission from the destination node to relay node R fails, the entire acknowledgement process fails.

Some wireless network protocols may insert random delays between transmissions by nodes to attempt to avoid collisions. The random delays can lead to an unmanageable amount of time being spent for an entire transmission and may not efficiently prevent non-participating nodes from transmitting collision-prone transmissions.

BRIEF SUMMARY

According to implementations of the disclosed subject matter a packet frame containing relay schedule information may be sent, which includes a different time that each of a plurality of nodes should transmit a frame. An acknowledge frame may be received from a first node of the plurality of nodes during a time that the first node is scheduled to transmit.

According to implementations of the disclosed subject matter, a packet frame may be received from a first node of a plurality of nodes. The packet frame may contain relay schedule information which indicates a different time that each of the plurality of nodes should transmit a frame. An acknowledge frame may be sent to a second node from the plurality of nodes during a scheduled transmission time.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Avoiding collisions during a transmission within a wireless network can improve network performance. Collisions may occur in a wireless network when one or more nodes in the network experience co-channel interference such that two or more different transmitters using the same frequency transmit at the same time. A receiver within range of the two or more transmitters may receive the transmissions at the same time, resulting in a collision which can invalidate all transmissions to the node, reduce the quality of one or more of the transmissions, or, more generally, can deteriorate the performance of the network. The transmissions may originate from participating nodes such that the two or more transmitting nodes are participants of a transmission. For example, if a source node intends to transmit a packet frame to a destination node via a relay node, then the source node, relay node, and destination node may be considered "participants" or "participating nodes". Additionally, transmissions may originate from non-participating nodes. A non-participating node may be a node that is not an included in a particular transmission or series of transmissions. For example, if a source node intends to transmit a packet frame to a destination node via a relay node, then a separate node that is not the source, relay, or destination node, may be considered a non-participant node since it is not involved in the transmission. It is beneficial to prevent or reduce collisions in a wireless network from both participant and non-participant nodes.

Figure 3:
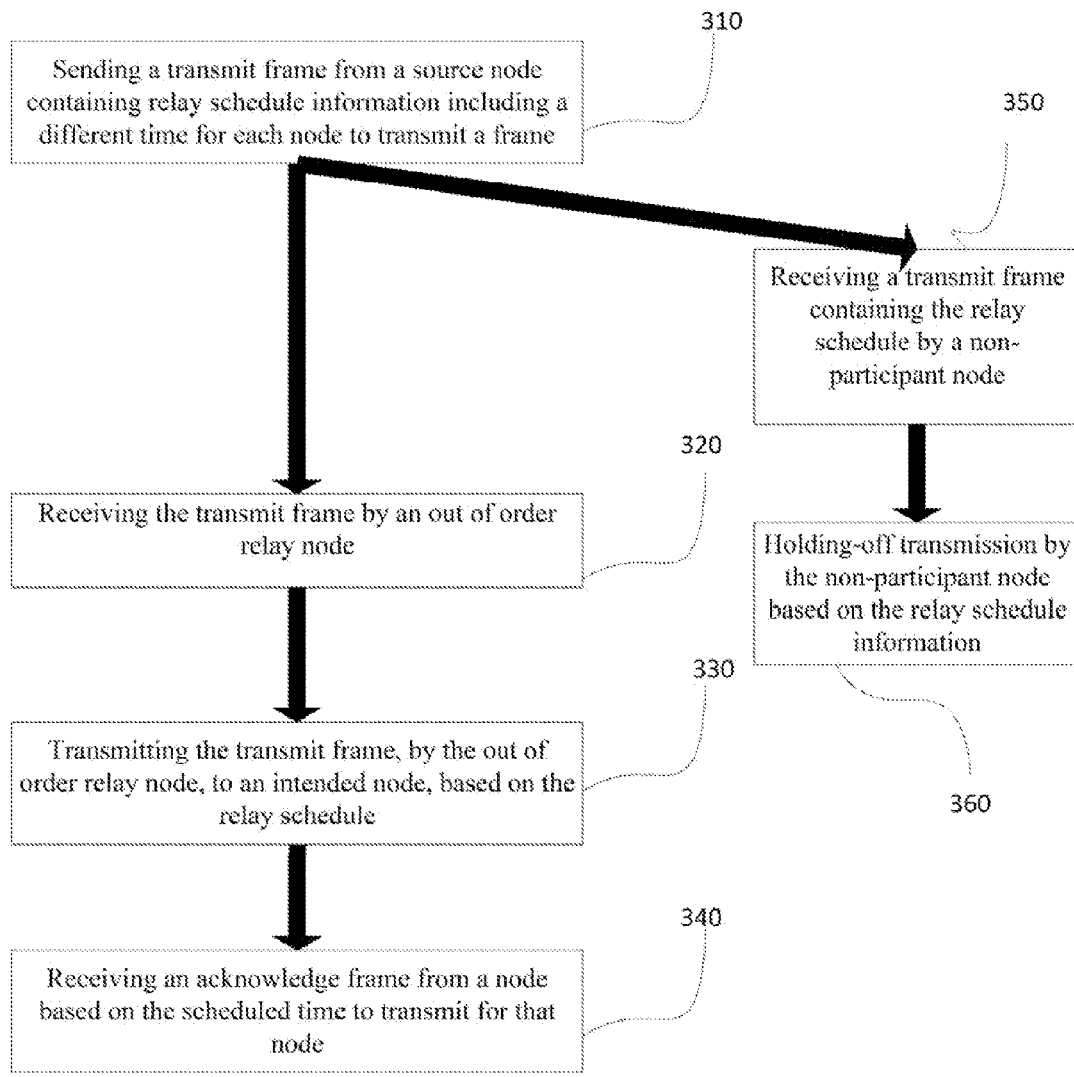
FIG. 3 shows an example process for transmitting a packet frame with scheduled relay information and receiving an acknowledge message according to an implementation of the disclosed subject matter.

FIG. 3 shows an example process for transmitting a packet frame with scheduled relay information and receiving an acknowledge message according to an implementation of the disclosed subject matter. As shown at step 310, a packet frame can be sent from a source node and may contain relay schedule information including a different time for each node to transmit a frame. For example, a Wi-Fi router may transmit instructions to a laptop computer via multiple relay nodes, which include a relay schedule. The schedule, in this example, can contain times for each relay in the network to repeat the transmission and different designated times such that the relay transmissions do not collide with each other. At step 320, a packet frame may be received by an out of order relay node. For example, a Wi-Fi router can send a transmission with a relay schedule, the relay schedule being ordered such that relay node 1, 2 and 3 are to receive and repeat the transmission, in order. Relay node 3 may receive the transmission out of order from relay node 1 and may not receive a transmission from relay node 2, as scheduled. At step 330, an out of order node may transmit a frame based on the relay schedule. For example, a relay node that receives a transmission out of order may repeat the transmission based on the relay schedule whether or not an in order transmission is received by the relay node.

According to implementations of the disclosed subject matter, a relay schedule can contain transmission times for acknowledge frames, or times at which relay nodes may transmit in general. The relay schedule may contain two times for a given node per transmission such that the relay node is assigned a first time for transmitting a packet frame and the same relay node is assigned a second time for transmitting an acknowledge frame. At step 340, an acknowledge frame can be received from a node at a scheduled transmission time for that node to transmit the acknowledge frame, according to the relay schedule. For example, a relay schedule may designate a time A for a relay node 3 to transmit, and, accordingly, relay node 3 may relay an acknowledge frame at time A, that was received from another node prior to time A. According to implementations of the disclosed subject matter, at step 350, a non-participant node may receive a packet frame containing a relay schedule. At step 360, the non-participant node may delay one or more transmissions based on the relay schedule information such that it does not transmit during the times that other participating nodes transmit, as designated by the relay schedule. As previously described, a non-participant node may be a node that is not an intended node with respect to a transmission chain. For example, a Wi-Fi router may transmit instructions along with a relay schedule that includes relay nodes 1, 2, and 3 as well as an implied total scheduled transmission lasting 1 second. A non-participating relay node 4 may also receive the transmission and, based on the relay schedule, may delay transmitting until the scheduled 1 second has passed.

According to implementations of the disclosed subject matter, the packet frame transmitted by a source node may contain, but is not limited to, a relay schedule, the length of a packet for transmission, the number of relay nodes intended to repeat the transmission, identifying information related to the relaying nodes, and frame transmission fields such as the source, destination, payload, and the like. The frame may be intended to be transmitted by each relay node within the transmission chain. Acknowledgements may originally be transmitted by the destination node or from individual relay nodes, or both. For example, each node that receives a transmission, including relay frames, may be required to acknowledge receiving the transmission to at least one other node in the transmission chain. Alternatively, only the destination node may generate an acknowledge frame, which is then relayed back to a source node that initiated the transmission.

According to implementations of the disclosed subject matter, as shown in FIG. 3 at step 310, a source node may transmit a frame containing relay schedule information. The frame may be or may include any applicable data transfer mechanism such as, but not limited to, one or more packets, one or more digital data transmissions, a sequence of bits, a sequence of symbols, or the like. The relay schedule information may be stored separate from a payload portion of a frame, and may be included in all transmissions of the frame or a sequence of related frames. For example, a digital data packet frame containing relay schedule information may initially be transmitted from a router. The intended destination of the transmission may be a video game console located remotely from the router. There may be three intermediate relays, Relay A, Relay B, and Relay C between the router and the video game console which can relay the transmission towards the console. According to this example, the router may initiate a transmission containing the frame which includes the relay schedule and a payload containing game instructions for the video game console. The relay schedule may be encoded using binary code. The payload containing instructions for the video game console may be separate from the relay schedule. Additionally, the times within the relay schedule may be organized with restricted hold-offs such that there are no hold-offs or minimal hold-offs between transmission times. Hold-offs can be buffer times such that a node waits, or holds off transmission. According to implementations of the present subject matter, there may be no hold-offs or very minimal hold-offs sufficient to counter variations in clocks or radio behavior, which may lead to faster transmission times. For example, in a transmission chain the relay schedule may assign nodes A, B, C, and D times 1x, 2x, 3x, and 4x respectively such that x corresponds to the time it takes for a transmission between one node to the next to occur, which may include any processing time expected for a transmission. Accordingly, there may be no hold-offs between transmissions and each node may transmit based only on the time delay caused by the transmissions themselves.

A relay schedule may contain different times for transmission by different nodes such that the participating source, relay, and destination nodes may each have assigned transmission times. A time may be a specific time or a range of times within which a certain action may take place. For example, the relay schedule may contain a time A for when a node X can transmit a frame. Alternatively, for example, the relay schedule may contain a range of time, such as between time B and time C, for when a node Y can transmit a frame. According to implementations of the disclosed subject matter, the transmission times may be distinct such that there are no simultaneous transmissions. For example, a source node, relay 1 node, and relay 2 node may be assigned times 1, 2, and 3 respectively. The times may be distinct from each other such that none of the source, or relay nodes transmit at the same time. Where the assigned times are time ranges, they may be distinct such that they do not overlap. Although typically the times do not overlap, the times may overlap, especially when a substantial distance exists between nodes relaying transmissions. A flag may be added to determine transmission interference potential and may allow overlapping times when the interference potential is below a threshold value. Additionally, a destination, relay 2 and relay 1 node may have times 4, 5, and 6 assigned to them respectively. The times may be distinct from each other such that none of the destination and relay nods transmit acknowledge frames at the same time, or within overlapping time periods. Transmitting based on distinct scheduled times may improve collision avoidance as the probability of receiving multiple frames by a node at a specific time may be reduced. Namely, the participating nodes that receive the frame or sequence of frames containing the relay schedule may not transmit other than at the designated time for the respective nodes to transmit.

According to implementations of the disclosed subject matter, as shown at step 320 in FIG. 3, a packet frame may be received by an out of order relay node. An out of order relay node may be a participating node that is part of the transmission chain. A transmission chain may include all nodes intend to either receive or transmit a transmission or acknowledge frame or set of related frames. Additionally, an out of order node may be a node not sequentially subsequent to the transmitting node. For example, a router may transmit an instruction message intended for a laptop, the instruction message to be relayed through relay A and relay B. The router, relays A and B, and the laptop may all be participating nodes part of the instruction message transmission chain. The nodes may be set up such that the router, relay A, relay B, and laptop are sequentially arranged in that order. If relay B receives a transmission directly from the router, instead of receiving it from relay A, then relay B can be an out of order relay node.

The order of nodes in a transmission chain may be determined based on the topology of the source, destination, or relay nodes. Namely, a sequentially subsequent node may be a node that is proximally closest to the transmitting node in the appropriate direction. For example, a source, relay A, relay B, and destination node may be arranged in a line such that the source is located at location 1, relay A at location 2, ten feet from the source in the x direction, relay B at location 3, ten feet from relay A in the x direction, and the destination node at location 4, ten feet from relay B in the x direction. Accordingly, the order of the nodes can be either source, relay A, relay B, destination or, in reverse as, destination, relay B, relay A, source. In essence, according to this example, the order is based on the physical location of the nodes. Alternatively, the order may be determined based on the relay schedule such that a sequentially subsequent node may be a node that temporally succeeds a current transmission time. For example, a relay schedule may contain transmission times for a source, relay A, relay B, and destination node such that the source is scheduled to transmit at time 1, relay A at time 2, 10 milliseconds after the source, relay B at time 3, 10 milliseconds after relay A, and the destination node at time 4, 10 millisecond after relay B. Accordingly, the order of the nodes can be the source, relay A, relay B and the destination node. In essence, according to this example, the order is based on the time each node is scheduled to transmit. As an example of ordering nodes based on network topology, a source, relay A, relay B, and destination node may be arranged such that the expected transmit time from the source to relay A is 4 ms, the shortest length of time between the source and any other node. The expected transmit time from relay A to relay B is 5 ms, the shortest length of time between relay A and any other node other than the source node. The expected time from relay B to the destination node is 4 ms, the shortest length of time between relay B and any other node. Accordingly, the order of the nodes can be either source, relay A, relay B, destination or, in reverse as, destination, relay B, relay A, source. In essence, according to this example, the order is based on the network topology associated with the given nodes. Network topology and arrangement may be based on considerations other than physical arrangement and expected transit time, as will be readily understood by one of skill in the art.

According to implementations of the disclosed subject matter, a relay schedule may be based on network topology as provided by a network controller. The network controller may communicate with a source node and the source node may develop a relay schedule based on the communication. For example, a network controller may determine the topology the network, and the network location of each node in the network, by transmitting instructions for all nodes to ping the controller. The controller can provide a source node with the topology information and the source node can determine which relay nodes are necessary for a transmission, and determine a relay schedule accordingly. Alternatively, the controller may determine the topology of each node in the network along with a relay schedule for a source node. The controller may provide the source node with the relay schedule and the source node may initiate a transmission accordingly. A controller may update network topology based on periodic pings such that the controller pings all the nodes during predetermined periodic intervals. Alternatively, the controller may update network topology by receiving automated pings when a node is added or removed from the network. Alternatively or in addition, one or more relay nodes may ping each other and/or a neighboring node and subsequently provide the controller with resulting transmission information. For example, each node in a transmission chain my ping one or more neighboring nodes and record signal strength or packet success rate data. Each node may transmit the information to a controller which can analyze the information and determine a relay schedule based on the analysis.

According to implementations of the disclosed subject matter, as shown at step 330 in FIG. 3, an out of order node may transmit a frame based on the relay schedule. Although typically an out of order node transmits a frame based on the relay schedule, the out of order node may, in certain circumstances, transmit a frame at a non-relay schedule designated time. An out of order node may receive a frame from a node that is not intended to sequentially precede the out of order node. The frame may contain a relay schedule and the out of order node may transmit based on the relay schedule such that the out of order node may transmit at a time provided by the relay schedule, the time corresponding to the out of order node. For example, a transmission chain may contain nodes A, B, C, and D in order. Node A may transmit a frame and node C may receive the frame out of order. The frame can contain a relay schedule with information that allows a node to determine a designated time, for example, 13 milliseconds, corresponding to node C. Accordingly, node C may transmit the frame at the 13 millisecond mark despite not receiving the frame directly from node B.

According to implementations of the disclosed subject matter, the transmission may be for a packet frame or an acknowledge frame. At step 340, an acknowledge frame can be received from a node at a scheduled transmission time for that node to transmit, according to the relay schedule. An acknowledge frame may contain the original relay schedule transmitted by a source during the initial transmission resulting in the acknowledge frame. Continuing the previous example, node D may transmit an acknowledge frame intended for node A via node C and B in order (i.e., from node D to C to B to A). Node B may receive the acknowledge directly from node D instead of node C. The relay schedule may contain a time, 20 milliseconds, corresponding to the transmission of an acknowledge frame by node B. Accordingly, at the 20 millisecond time mark, node B may transmit the acknowledge frame to node A based on the relay schedule despite not receiving the acknowledge frame directly from node C. Notably, a node may receive a transmission and advance the activities within a transmission chain based on a predetermined schedule regardless of whether or not the transmissions are received in order or out of order.

According to implementations of the disclosed subject matter, as shown in FIG. 3 at step 350, a non-participant node may receive a packet frame containing a relay schedule. As disclosed herein, a non-participant node may be a node that is not part of the transmission chain for a given transmission. The non-participant node may receive a packet frame due to the close proximity of the non-participant node. At step 360, the non-participant node may delay one or more transmissions based on the relay schedule information such that it may not transmit during the times that other participating nodes transmit, as designated by the relay schedule. The non-participant node may implement a listen before transmission scheme, and may delay transmissions that conflict with other transmissions. The relay schedule for a transmission chain may enable a non-participant node to determine when a transmission by the relay node may be a conflicting transmission. For example, a relay schedule may contain transmission times which begin at a given time X and end at a time Y. A non-participant node may receive the transmission with the relay schedule and not transmit between time X and Y. Alternatively, the relay schedule may contain transmission times between two ranges; U and V and X and Y. The non-participant node may receive the transmission with the relay schedule and not transmit during the two ranges of time, but may transmit at a time W, which falls between the two ranges.

Figure 4A:
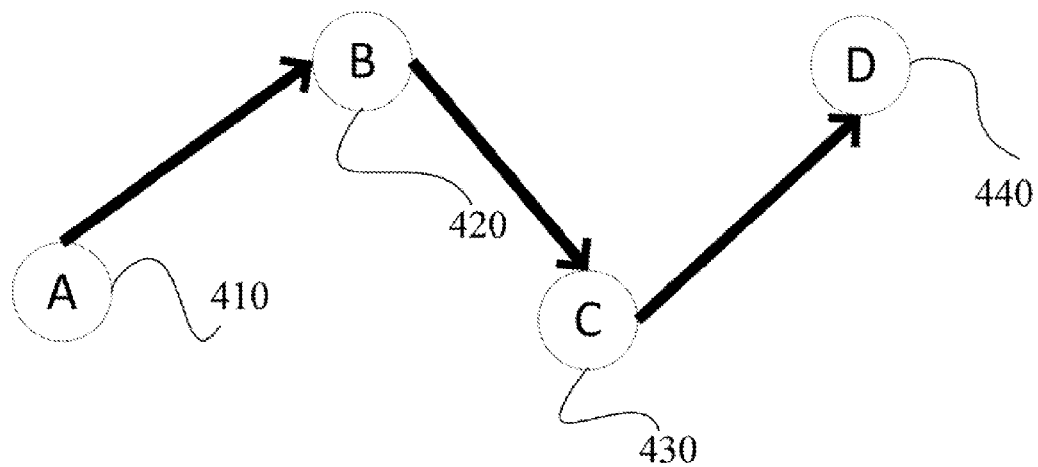
FIG. 4a shows an example visualization corresponding to a node structure and intended transmission route according to an implementation of the disclosed subject matter.

In an illustrative example of the disclosed subject matter, FIG. 4a illustrates an intended path of transmission from a source A 410 to a destination D 440. The transmission chain includes the source A 410, relay node B 420, relay node C 430, and destination D 440. The order of the nodes, according to this example, is A, B, C, and D based on location as shown in FIG. 4a. Although the order in FIG. 4a is shown using physical proximity for illustration purposes, it will be understood that network distance, priority, or other relative measure may be used without departing from the scope and content of the example or the subject matter disclosed herein. Alternatively, the order of the nodes, according to this example, is A, B, C, D, based respective times in a relay schedule as shown in Table 1.

TABLE 1

| Node | Transmission Time (ms) | Acknowledge Time (ms) |
|---|---|---|
| A | 0 | — |
| B | 5 | 25 |
| C | 10 | 20 |
| D | — | 15 |

Figure 4B:
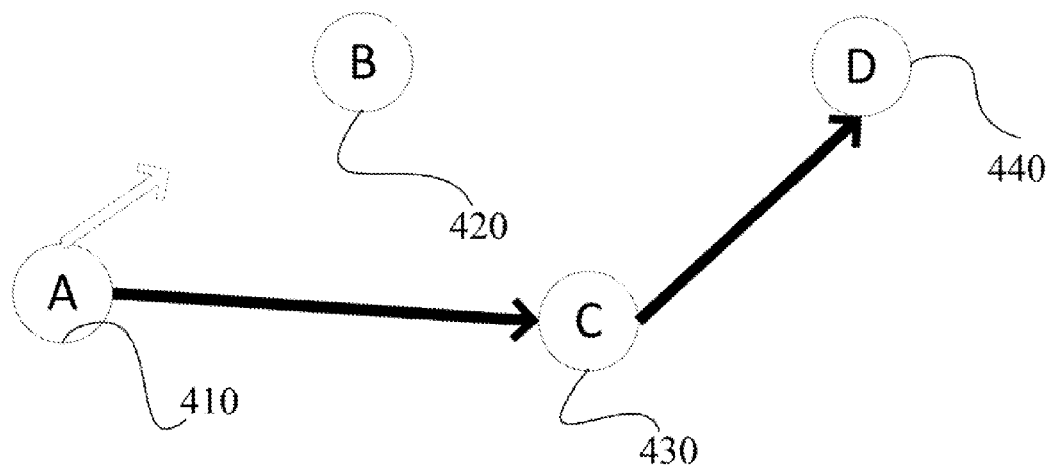
FIG. 4b shows an example visualization corresponding to a node structure and an un-intended transmission route according to an implementation of the disclosed subject matter.

The source A 410 may transmit a packet frame containing the relay schedule at 0 ms based on the time designated by the relay schedule. The 0 ms may be arbitrary such that it can correspond to any time that the source node A 410 initiates the transmission. The subsequent relays times for all the nodes may be based on the initial transmission. For example, after the initial transmission by source A 410, the subsequent transmission by node B 420 can be 5 ms after the initial transmission. As shown in FIG. 4a, the transmission may proceed as intended from source A 410 to relay node B 420 to relay node C 430 to and destination D 440 based on the scheduled times. As shown in FIG. 4b, the initial transmission from source A 410 may not be received by node B 420 as intended. Instead, the transmission from source A 410 may be received by node C 430. Node C may relay the transmission to destination D 440 10 ms after the initial transmission, in accordance with the relay schedule. Notably, node C 430 may relay the transmission to destination D 440 at the 10 ms mark regardless of whether it receives the transmission, as intended, from relay B 420 or from another source (e.g., source A 410).

Figure 4C:
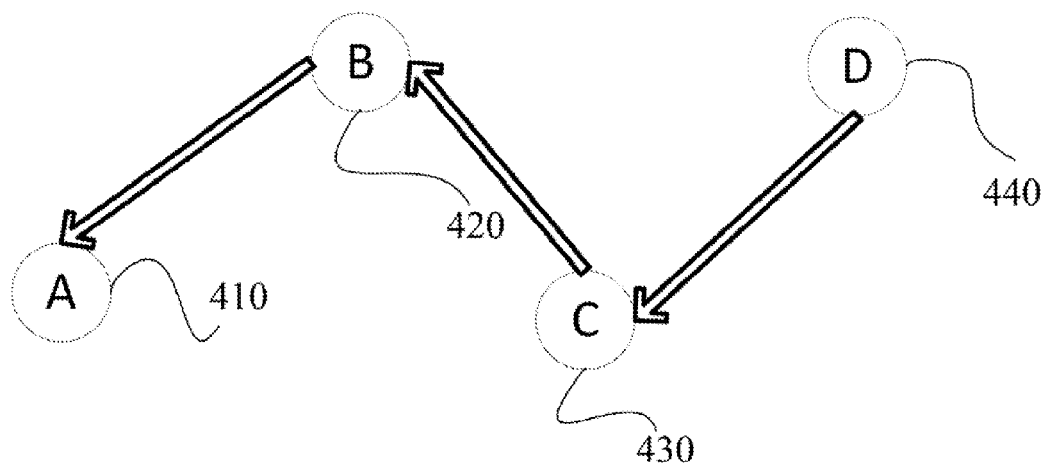
FIG. 4c shows an example visualization corresponding to a node structure and intended acknowledge route according to an implementation of the disclosed subject matter.
Figure 4D:
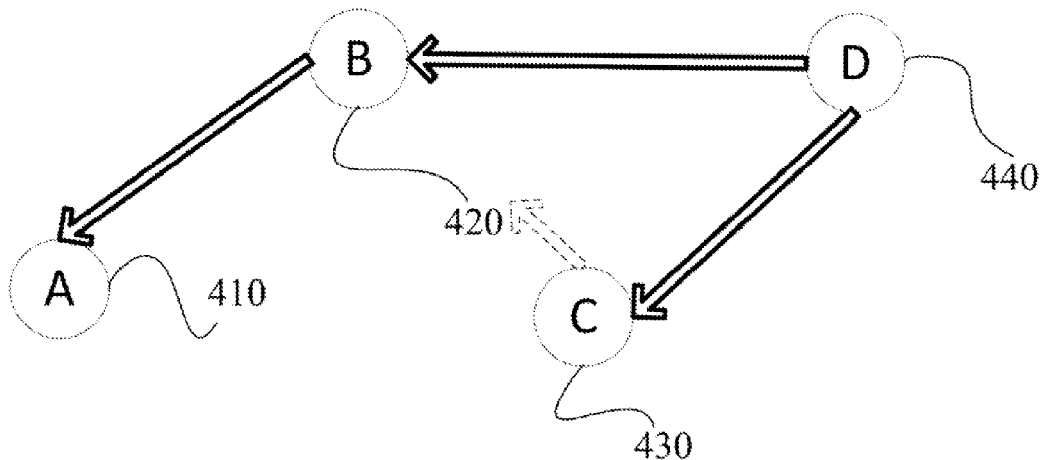
FIG. 4d shows an example visualization corresponding to a node structure and un-intended acknowledge route according to an implementation of the disclosed subject matter.

Continuing the example, the destination D 440 may transmit an acknowledge frame containing the relay schedule at 15 ms based on the time designated by the relay schedule. The subsequent relay nodes may also transmit the acknowledge frames based on the relay schedule. For example, after the acknowledge frame transmission by destination D 440, the subsequent acknowledge transmission by node C 430 can be 20 ms after the initial transmission. As shown in FIG. 4c, the acknowledge transmission may proceed as intended from destination D 440 to relay node C 430 to relay node B 420 and then source A 410 based on the scheduled times. As shown in FIG. 4b, the acknowledge transmission from destination D 440 may not be received by node C 430 as intended. Instead, the acknowledge transmission from destination D 440 may be received by node B 420. Node B may relay the transmission to source A 410 25 ms after the initial transmission, in accordance with the relay schedule. Notably, node B 420 relays the acknowledge transmission to source A 410 at the 25 ms mark regardless of whether it receives the transmission, as intended, from relay C 430 or from another source (e.g., destination D 440).

Figure 1:
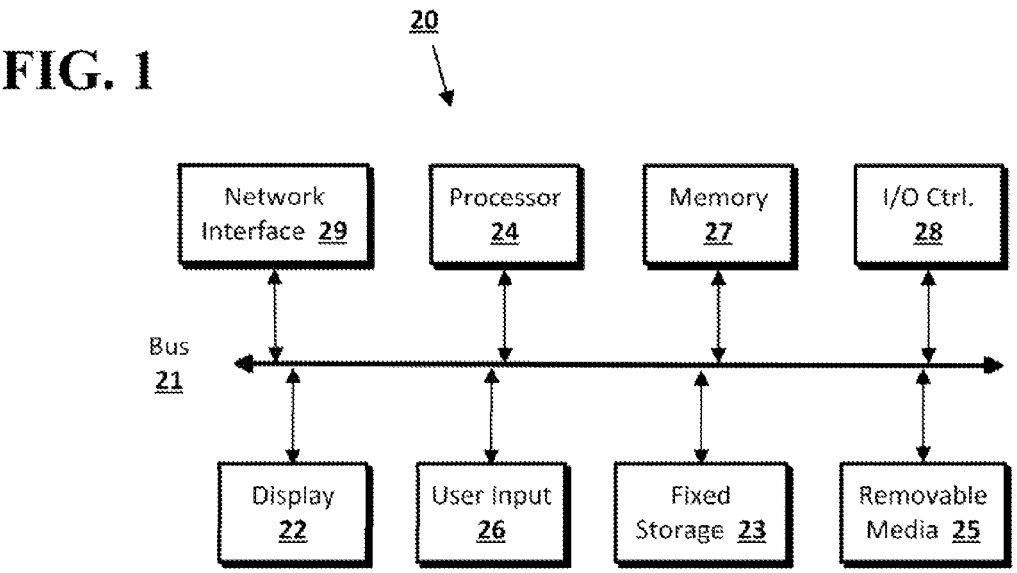
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
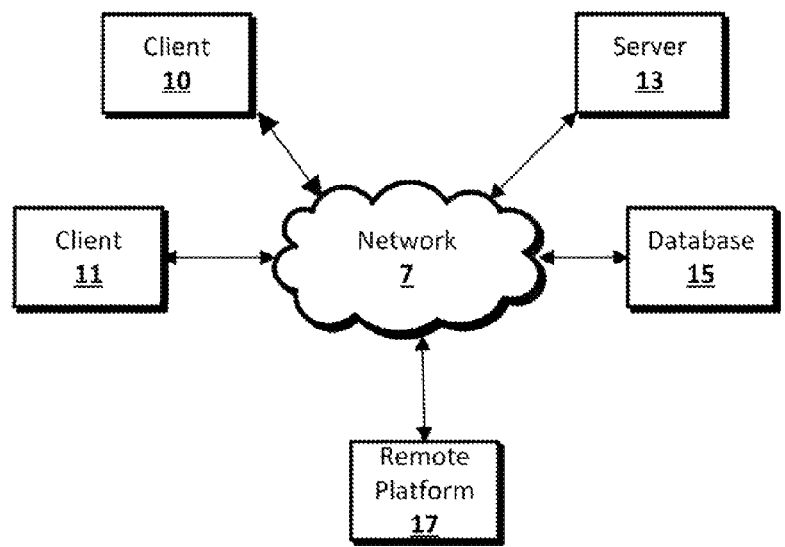
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    sending a packet frame, the packet frame comprising relay schedule information, wherein the relay schedule information comprises a different time for each of a plurality of nodes in a wireless network, the different times corresponding to times that each node should transmit a frame,
    wherein a node which receives a frame in a non-intended order transmits a frame according to the relay schedule information.

2. The method of claim 1, further comprising receiving an acknowledge frame from a first node of the plurality of nodes during a time that the first node is scheduled to transmit.

3. The method of claim 2, wherein the steps of sending the packet frame and receiving the acknowledge frame are performed by a node in the wireless network.

4. The method of claim 2, wherein the acknowledge frame indicates that the packet frame was received by a second node.

5. The method of claim 2, wherein a non-participant node receives relay information from a frame selected from a group consisting of the packet frame and the acknowledge frame.

6. The method of claim 5, wherein the non-participant node delays a potentially interfering transmission based on the relay information.

7. The method of claim 1, wherein the relay schedule information restricts hold-offs between transmissions.

8. The method of claim 1, further comprising:
    receiving the packet frame containing the relay schedule information by a non-participant node; and
    postponing a transmission that would otherwise be sent by the non-participant node based on the relay schedule information.

9. The method of claim 1, wherein the relay schedule information is established by a transmit node based on network topology.

10. The method of claim 1, further comprising:
    receiving route information from a controller device; and
    generating relay schedule information based on the route information.

11. The method of claim 1, wherein a node which receives a frame in an intended order transmits a frame according to the relay schedule information.

12. The method of claim 1, wherein the relay schedule information is based on information gathered from previous relays.

13. A method comprising:
    receiving a packet frame from a first node of a plurality of nodes, the packet frame comprising relay schedule information, wherein the relay schedule information comprises a different time for each of the plurality of nodes in a wireless network and indicates a time that each node should transmit a frame, wherein a node which receives a frame in a non-intended order transmits a frame according to the relay schedule information.

14. The method of claim 13, further comprising sending an acknowledge frame to a second node from the plurality of nodes during a scheduled transmission time.

15. The method of claim 14, wherein the steps of receiving the packet frame and sending the acknowledge frame are performed by a node in the wireless network.

16. The method of claim 14, wherein the first node and the second node are the same node.

17. The method of claim 14, wherein the first node and the second node are different nodes.

18. The method of claim 14, wherein the acknowledge frame indicates that the packet frame from the first node was received.

19. The method of claim 14, wherein a non-participant node receives relay information from a frame selected from a group consisting of the packet frame and the acknowledge frame.

20. The method of claim 19, wherein the non-participant node delays a potentially interfering transmission based on the relay information.

21. The method of claim 13, wherein the relay schedule information restricts hold-offs between transmissions.

22. The method of claim 13, further comprising:
    receiving the packet frame containing the relay schedule information by a non-participant node; and
    postponing a transmission that would otherwise be sent by the non-participant node based on the relay schedule information.

23. The method of claim 13, wherein the relay schedule information is established by a transmit node based on network topology.

24. The method of claim 13, wherein the relay schedule information is based on route information generated by a controller.

25. The method of claim 13, wherein a node which receives a frame in an intended order transmits a frame according to the relay schedule information.

26. The method of claim 13, wherein the relay schedule information is based on information gathered from previous relays.

* * * * *